United States Patent [19]

Sansone et al.

[11] Patent Number: 5,051,914

[45] Date of Patent: Sep. 24, 1991

[54] OPTIMIZING MAIL DELIVERY SYSTEMS BY MERGING MAILINGS

[75] Inventors: Ronald P. Sansone, Weston; Karl H. Schumacher, Westport, both of Conn.

[73] Assignee: Pitney Bowes Inc., Stamford, Conn.

[21] Appl. No.: 416,733

[22] Filed: Oct. 3, 1989

[51] Int. Cl.[5] ........................ G06F 15/21; G07B 17/02

[52] U.S. Cl. .................................... 364/478; 364/401; 364/464.02

[58] Field of Search .............. 364/478, 464.02, 464.03, 364/466, 401, 402, 200 MS File, 900 MS File; 235/375, 432; 270/54-58; 53/266 A, 504; 209/584, 900

[56] References Cited

U.S. PATENT DOCUMENTS

| | | | |
|---|---|---|---|
| 4,796,196 | 1/1989 | Durst, Jr. et al. | 364/478 |
| 4,797,830 | 1/1989 | Baggarly et al. | 364/478 X |
| 4,800,505 | 1/1989 | Axelrod, Jr. et al. | 364/478 |

*Primary Examiner*—Joseph Ruggiero
*Attorney, Agent, or Firm*—Peter Vrahotes; Melvin J. Scolnick; David E. Pitchenik

[57] ABSTRACT

A system and method for optimizing mail delivery of batch mail. A network is established interconnecting plural batch mailers, a data center, and the Postal Service. Mail data on the mail batches is transmitted to the data center. This enables the data center to generate data to the mailers for merging mail batches to achieve additional postage discounts, to schedule and route mail carriers external to and within the Postal System to increase efficiency of handling, and to interact with the Postal Service for logistics planning and drop-off point and timing of mail batches to expedite processing.

32 Claims, 10 Drawing Sheets

OPTIMIZING MAIL DELIVERY SYSTEMS BY MERGING MAILINGS

This invention relates to article processing and delivery, and specifically to improvements in mail processing systems which will relieve official postal facilities of certain mail handling tasks.

BACKGROUND OF THE INVENTION

As discussed in commonly-assigned U.S. patent application, Ser. No. 285,891, filed Dec. 16, 1988, U.S. Pat. No. 5,008,827, the contents of which are herein incorporated by reference, the United States currently has the world's largest postal system. The U.S. Post Offices currently handle in excess of 100 billion pieces of mail per year, about half the total volume handled throughout the world. The servicing of mail delivery involves three essential steps; collection, sorting and delivery. Collection takes place through a series of Post Offices spread throughout the United States. The United States has about 30,000 Post Offices that provide mail services in addition to 9,000 smaller postal centers which provide some type of mail service. Postal employees typically take letters and packages from mail box facilities to the nearest local office where it is accumulated for the sorting procedure. At the Post Office, postal clerks remove collected mail from sacks, bundle packages and segregate mail by size and class into separate categories. The mail travels by truck from local post offices to a central facility known as a sectional center. The United States has 264 sectional centers, some of which serve hundreds of local Post Offices. The sectional center processes nearly all the mail coming or going from its region. At the sectional center, high speed automated equipment sorts large volumes of mail.

A computerized machine known as a zip mail translator sorts the postmarked letters according to their destination post office. Postal workers selectively activate the machine's keyboard to send each letter on a conveyor belt into one of many bins. Each bin holds mail for a different Post Office or postal region. Mail addressed to locations outside the regions served by the sectional center are transported by truck, airplane or train by various carriers via various routes to other sectional centers for further sorting. Finally, postal clerks hand sort mail for the area served by the local office into bundles for each delivery route.

Current estimates indicate that the foregoing processing tasks necessarily involve in excess of half a million employees. Cost of maintaining and supporting sorting services at the central post office facilities, even including large scale use of automated equipment, has become staggering. Projections of substantial increases in volumes of mail being transported through central facilities, even with the advent of private delivery, telecommunications services, facsimile services and the like indicate a rapid expansion will be required of such facilities. Since the Postal Service is a private corporation and is expected to become self-supporting, rapidly advancing postal rates place greater and greater burdens on both user and the Postal Service in order to support such volumes of mail. In recognition of capabilities of certain high volume users to provide services to central postal facilities, which services may improve efficiency and reduce the amount of processing time required by the central serving facilities, the U.S. Postal Service offers substantial reductions in rates or discounts, provided that a user comply with certain requirements which will allow the U.S. Postal Service to take advantage of certain user-provided facilities to reduce its own work load. The concept of work sharing, wherein a user provides certain of the processing activities prior to delivering the mail to the postal system, has been proposed in the copending application and is therefore a positive innovation in the field of mail processing which may have a substantial impact in the future implementation of mail services.

However, placing a burden on the user to provide certain of the facilities and services which the U.S. central post office facilities now provide is an equally heavy burden for the user, and must be done in a manner which permits the user to realize substantial savings with its own increased work load by taking advantage of the reduced postal service rates while not exceeding the costs of providing such services on its own.

The Postal Service has already recognized the ability of users to preprocess certain kinds of mail and will accept mail in bulk or in batches delivered from a processor along with documentation or certification that its procedures and regulations have been complied with, and will accept such certification as prima facia justification for a reduction in Postal Service rates. Thus, for example, manifest systems, wherein a manifest is provided to the central post office representative of a batch of mail documents preprocessed by the user, are already known and do allow the user to realize substantial discounts. However, to realize such discounts requires the user to maintain within the user's facility information regarding internal postal procedures and regulations, such as rates, volume, quantity discounts and the like, in order for the post office facility to accept as valid a certification by the user that certain procedures mandated by the Postal Service have been complied with. Moreover, often a single user cannot generate on a regular basis sufficient mail pieces to make up a batch that would qualify for extra discounts or for the maximum discount available, or a batch of mail pieces addressed to one or a selected small number of destinations (determined by zip codes) sufficient to qualify for extra or maximum discounts, or, say, a batch of mail pieces addressed with a font or bar code for efficient processing by automatic optical character reader (OCR) equipment at the postal facility sufficient to qualify for extra or maximum discounts offered by the Postal Service.

DESCRIPTION OF RELATED APPLICATIONS

Systems relating to work share features are discussed in copending commonly-assigned application, Ser. Nos. 234,977, U.S. Pat. Nos. 5,005,124 and 285,891, U.S. Pat. No. 5,008,827, filed Aug. 23, 1988 and Dec. 16, 1988, respectively, the contents of which are hereby incorporated by reference. These applications relate to the concept of using certain limited user provided services but does not encompass the full range of work sharing and data sharing services and concepts presented herein.

Commonly-assigned U.S. Pat. No. 4,713,761 describes a system for determining and accounting for the costs of shipping goods, which focuses mainly on a centralized accounting facility for multiple shippers and carriers.

Commonly-assigned U.S. Pat. No. 4,837,701 also describes a computerized system for processing and accounting for batch mail.

Commonly-assigned U.S. application, Ser. No. 285,486, filed Dec. 16, 1988 describes and claims another data sharing system via a centralized database to improve user performance, the contents of which are incorporated herein by reference.

Concurrently-filed, commonly-assigned U.S. application, Ser. No. 416,732 describes and claims other aspects of systems for improving delivery efficiency.

Commonly-assigned U.S. Pat. Nos. 4,800,504; 4,800,505; and 4,800,506 describe computerized systems for preparing stationery items and their subsequent processing into mail pieces.

Commonly-assigned U.S. Pat. No. 4,817,042 also describes a computerized inserter machine for optimizing the final weight of a mailpiece.

Concurrently-filed, commonly-assigned U.S. applications, Ser. Nos. 416,745 and 416,736 describe claim other aspects of the herein-described system for improving delivery efficiency.

SUMMARY OF THE INVENTION

It is therefore a principal object of the present invention to provide a system and apparatus that enables a more efficient and effective use of the facilities of the post office.

Another object of the invention is a system and method to enable individual users creating batch mailings to realize extra discounts of postage funds required by the Postal Service to process and deliver the mail pieces making up the batch mailings.

A further object of the invention is a system and method for optimizing delivery of bulk mail from mailers to a post office and from post office to post office within the Postal System.

In accordance with one aspect of the invention, a data center is provided that is connected by way of a data communications network or links to a plurality of user or mailer stations that each generate batch mailings. The communications link includes computers at the mailer stations and at the data center. Via the communications link, the data center receives from each of the mailer stations the mail parameters of each batch of mail that has been or will be generated for early delivery to the Postal Service. The data center computer maintains a database with up-to-date, current information on all published Postal Service regulations governing qualification of batch mailings for rate reductions or discounts. The individual batch parameters are also stored in a database at the data center. The data center now processes the information in those databases to create data for merging parts of the individual batch mailings, or batches from some of the mailers, up to and including all of the batches of the individual mailers ready, or being made ready, for Postal Service delivery. The criteria for this batch assembly or merging process, is, generally, to optimize delivery time, reduce costs, or both. Preferably, the merging is done to create data representative of new merged batches or new denser batches that will qualify for extra discounts. By "denser" is meant more mail pieces in a batch, or more mail pieces in the batch addressed to selected destinations, or a batch made up of mail pieces addressed with indicia processable by the same Postal Service equipment. The latter include the same size envelope, the same fort, or the same bar-code stampings, among other items.

The data center thus performs batch mail optimization for multiple mailers to reduce the costs of Postal Service processing and delivery. This benefits the Postal Service by enabling it to process more efficiently the denser mail batches delivered to it. It benefits the mailers because they can share in the extra discounts made available and that would not ordinarily be available to them due to the nature of their bulk mailings.

In accordance with further features of the present invention, the data center informs the individual mailers how to prepackage their batch mailings so they can readily be combined with batch mailings of other users on the system. In addition, the data center has stored in its memory the batch parameters of the mailers, it is a readily simple matter using that stored information to create the data needed for the documentation that will accompany the new merged batch—such as the previously described manifest or what is known as Form 3602 information—for the batch to qualify for the extra discounts.

In accordance with a further feature of the invention, at least one second station is provided that is connected into a communications link with the data center. This second station is provided with facilities for sorting and densifying incoming mail batches received from the individual mailers. In addition, it is provided with a printer for printing mail batch or manifest information. The data compiled at the data center for the merged mailings is transmitted to the second station, which, upon receiving from the mailers the relevant mail batches, now processes those batches in accordance with the merged batch data parameters to actually form the new merged batches, attach to them the new batch documentation, and arrange for delivery to the Postal Service. Various known techniques can be employed to provide the confirmed postage funds to accompany the new batches, or to account to the Postal Service for the necessary funds, and to allocate the costs and savings among the mailers supplying the batch mailings.

In accordance with still other features of the present invention, the mail processed by the second station can be in physical or electronic form, determined by communication exchanges between the mailers and the data center.

Other features, which are claimed in concurrently-filed Applications, Ser. No. 416,745 and 416,737, and which can be readily combined with the present invention, include the following.

The data center, having stored in its memory the batch parameters of the individual mailers which could include schedules of when physical batch mailings would be ready to be picked up at the individual mailer sites, can organize and coordinate physical mail pick-up by carriers to further reduce the mailer's transport costs to the second station or other merging station. This coordination can involve selection of carriers and routing of carriers to reduce expenses.

Also, a data communications link can be established with the Postal Service. Again, since the data center computer contains the information characterizing the denser mail batches, by communication exchanges with the Postal Service by way of linked computes, the Postal Service can be given advance information of the actual delivery date and time of the densified mail batches it will soon receive, and their characteristics important for the Postal facility to know in order to marshal its resources for processing these merged batches. Such information can be very valuable to the Postal Service in its logistics planning, especially since batch mailings represent by far the preponderance of its workload. From the opposite viewpoint, armed with knowledge of Postal Service resource availability and planning, the data center can inform its users when to time their deliveries of batch mail to assure more rapid processing by the Postal Service. It is also relatively simple for the data center to maintain a database of carriers used by the Postal Service to transport physical mail from facility to facility and ultimately to the local Post Office at the mail piece destinations. Thus, the data center can supply to the Postal Service information useful for carrier selection and carrier routing within the Postal Service system, thereby reducing its processing costs, all of which can be rewarded to the mailers by way of extra discounts.

The various invention features disclosed in this application can be used separately or combined, or combined with various features disclosed and claimed in the above-referenced related applications. For example only, the certification system described in application Ser. No. 285,145 also requires a communications network established between mailer facilities, and a data center, and the Postal Service. The same communications network can be employed in the present invention, and the certification concept readily integrated into the system described in this application to increase the amount of preprocessing carried out before the mail is dropped off at the Post Office. Similarly, the features disclosed herein can build on the database compilation and categorization described in related application Ser. No. 285,486, which likewise uses a communication network linking many users via a data center. As will therefore be evident to those skilled in the art, the present invention provides a very significant extension of the concept of work sharing of the benefit of all entities involved in mail generation, processing, and delivery, and thus ultimately for the benefit of the public.

BRIEF DESCRIPTION OF THE DRAWINGS

The foregoing brief description and summary of the invention will become more apparent from the following more detailed description of the invention, accompanied by the attached drawings, wherein.

SUMMARY OF PRIOR APPLICATION DISCLOSURES INCORPORATED HEREIN

Figure 1:
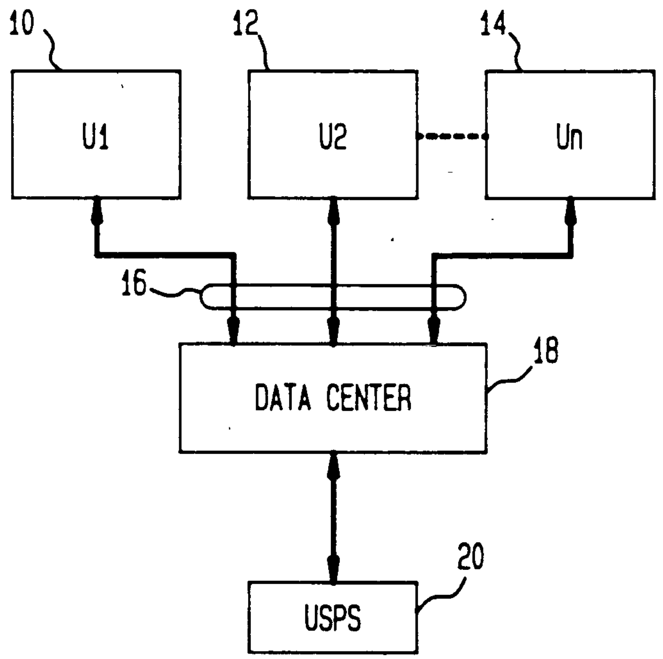
FIG. 1 is a functional block diagram illustrating the relationship between a data center, the U.S. Postal Service, and local users.

With reference to FIG. 1, a plurality of user stations designated as $U_1$, $U_2$. . . $U_n$, and identified as 10, 12 and 14 are shown. It will be understood that multiple user stations are possible in excess of the three shown, and that these are shown by way of example only. These stations are coupled by means of an interconnection data communication network, illustrated generally as 16, to the data center 18, which in turn may be appropriately coupled by means of a secure data line or the like to the U.S. Postal Service 20. The data center is a facility run by a commercial operation, such as Pitney Bowes, Inc., the assignee of the present invention. Each of the blocks 10, 12, 14, 18 and 20 contemplate the use of data processing components, each appropriately interlinked by means of high speed telecommunication links or the like for the purposes of exchanging information. It is also contemplated within the scope of the invention that the U.S. Postal Service will maintain an appropriate computer facility, not specifically described herein, which will possess the capability of uploading and downloading specific pieces of information upon request by the data center, and relating to appropriate postal rules and regulations which will effect the use of certain discounts in mailing postal rates, as well as other factors necessary for the concept of shared work services which will be certified by each of the individual user stations in order to qualify for additional discounts when mail is received in the U.S. Postal Service facilities. The specific pieces of information will also be information relating to Postal Service planning and operations, as well as carriers that may be available for use and routing. The communication link is also contemplated as a two-way link between units 18 and 20, wherein the U.S. Postal Service can have, if desired, the capability of monitoring specific operations within the data center in order to ensure the data center is operational in accordance with rules and requirements which may be imposed by the Postal Service from time to time. The monitoring operation can be periodic unscheduled communication link examinations of certain storage areas of accessed memory locations for confirming proper operations. Of course, visual on-site inspections and examinations may also be made.

Figure 2:
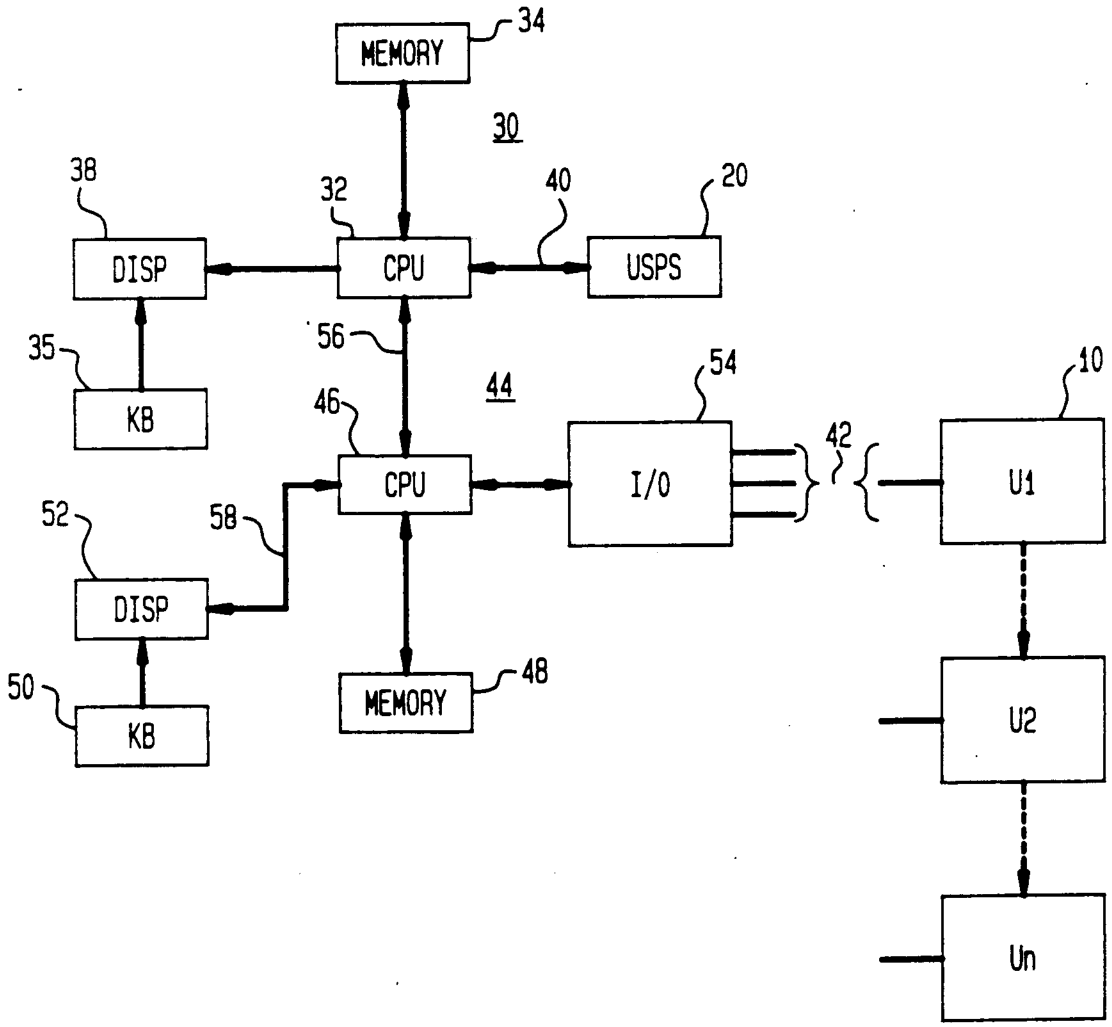
FIG. 2 is a more detailed block diagram illustrating the system of FIG. 1.

With reference to FIG. 2, a more detailed functional component relationship of the system of FIG. 1 is illustrated. Thus, the data center includes a first data channel 30 which includes a CPU 32 having a program memory 34, a keyboard 36 and an appropriate display 38 coupled thereto. Data communication link 40 interconnects CPU 32 to the U.S. Postal Service 20. The user units 10 are coupled via appropriate telecommunication data links 42 to a second data channel 44 which includes a CPU 46, a program memory 48, a keyboard 50 and an appropriate display 52. The CPU is coupled to the data links 42 by means of a multi-channel IO device 54 capable of high speed data communication.

In operation, two-way communication between the data channel 30 and the U.S. Postal Service 20 provide a continuous interchange of information regarding updates of U.S. Postal Service rules and regulations covering rate reductions and as may be required for the continuous certification use by the local users 10. In addition, the data channel 30 may also be manually interrogated by means of keyboard 36 for inquiring of the Postal Service for specific information which may be employed with regard to compliance with certifications, the answering of specific data questions, or other uses requiring specific interrogation by means of the central station to the U.S. Postal Service. Since the U.S. Postal Service link is a two-way communication over channel line 40, it is possible through this link for the U.S. Postal Service to interrogate and monitor the operation of the first data channel 30 and the second data channel 44, for compliance with quality control and other security compliances which may be required by the U.S. Postal Service.

Turning now to the second data channel 44, high speed continuous two-way communications with respect to continuous update of U.S. Postal Service requirements for certification, servicing and diagnostics, training, and other information interchange, as described in application, Ser. No. 285,891, U.S. Pat. No. 5,008,827 are effected by means of the CPU 46 operating through the high speed data channel 54 interfaced along with communication lines 42 to the multiple user network U1, U2 . . . Un. Operating under control of the program memory 48, the CPU 44 is contemplated as a high speed multiple processing information apparatus of conventional design such an IBM 3083 or a CD VAX unit which may handle multiple requests from any one or more of the users simultaneously through the multiple channel I/O device. Keyboard 50 and display 52 may be utilized for manual information interchange between any of the local users and the information operator. Although only a single keyboard display unit is illustrated, it will be understood that dataline 58 is a schematic representation of the existence of a multiple number of display keyboard combinations evidencing the use at the central station of a plurality of key operators available to answer user questions upon interrogation.

Figure 3:
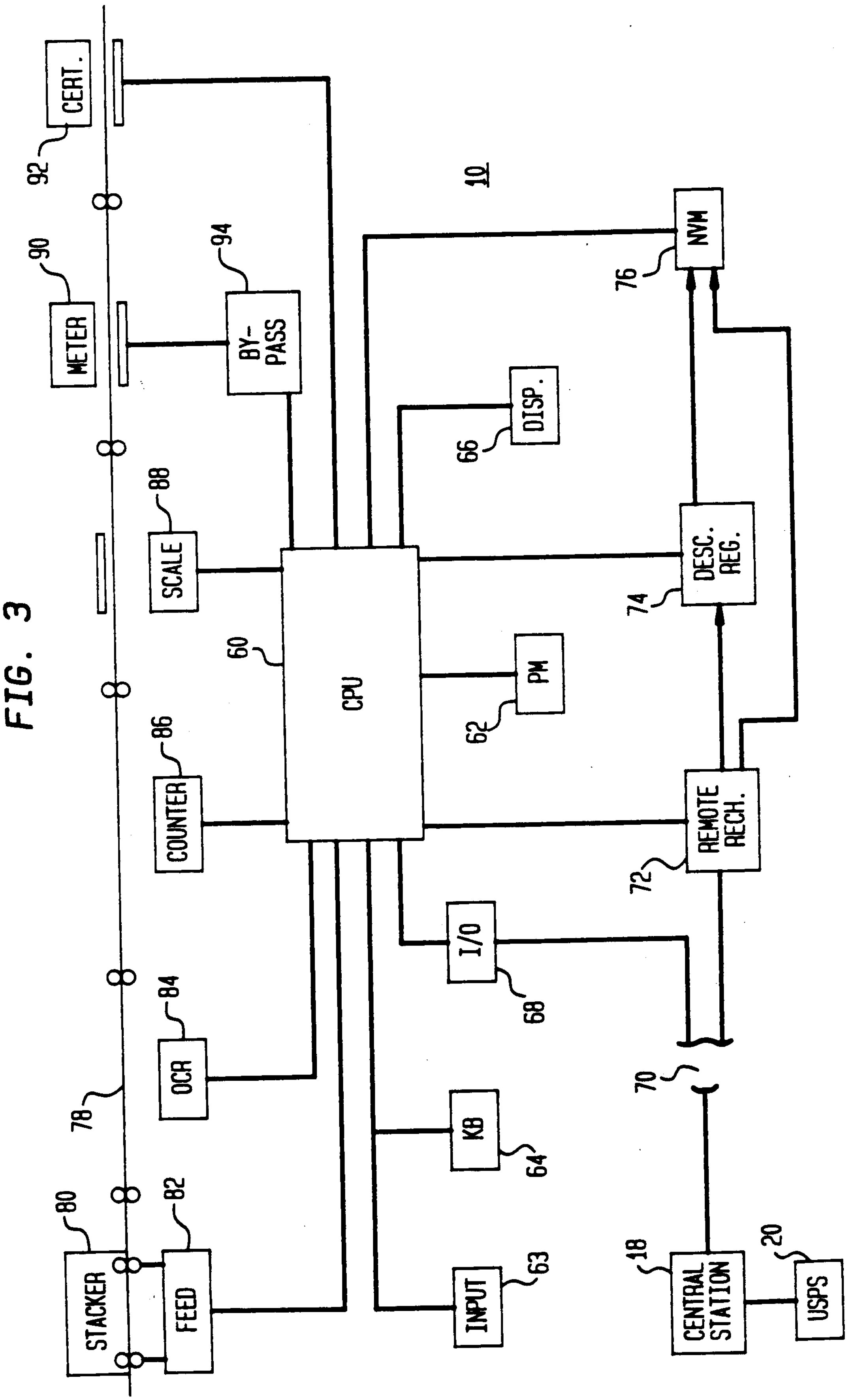
FIG. 3 is a more detailed block diagram illustrating a typical user or mailer station.

Referring to FIG. 3, a function block diagram illustrating the interrelationship of typical components within each individual user station is illustrated. The central user station operates under the control of a CPU 60, which includes a RAM memory and appropriate control registers. Coupled to the CPU 60 is a program memory 62 which defines the essential function of the system, including updating instructions and rates used in the local user units, diagnostic monitoring, a two-way communication link establishing a tracking facility utilizing, for example, the encryptic key represented by the certification, and interface capabilities with respect to the central station for the downloading of training information which enables operators at local stations to understand and comply with specific requirements imposed by the U.S. Postal Service with respect to the certification process. These capabilities are described in more detail in the related applications, Ser. Nos. 285,891 and 285,486. Coupled to the CPU 60 are a keyboard 64 for the manual entry of data requests and other information into the CPU, display unit 66 and an I/O channel 68 coupled by means of a data link 70 to the central station 18. Accounting information and funding to the local user 10 is effected through the data link 70 from the central station 18 to the remote recharger mechanism 72, operating in accordance with conventional recharging techniques, such as disclosed in U.S. Pat. No. 4,787,045, assigned to the assignee of the present application. Remote recharging unit 72 charges a descending register 74, in conventional manner, which keeps track of descending balances charged from time to time in accordance with mail requirements. Non-volatile memory unit 76 is employed to maintain security of information during periods of time when local user unit 10 is not operating. Non-volatile memory 76 receives descending register balances as part of a shutdown routine, along with other security data which may be applied from the active memory of the CPU 60. Remote recharging operations are carried on in remote recharging circuit 72 via the data link 70 to the central station 18, and operates independently of the OFF/ON status of the local user unit 10 for monitoring purposes. Thus, even if the local unit 10 is turned off, central station 18 through data link 70 may inquire through the remote recharging unit of the status of certain pieces of information which are maintained either in the RAM memory portion of the CPU 60 during on-times of the unit 10 or in the non-volatile memory 76 during inactive status periods. Another accounting system is described in commonly-assigned U.S. Pat. No. 4,796,193.

A concept of work sharings entail the performance of certain postal service functions by the user in a secure manner so as to enable the user to apply not only postage but to also apply certification, as an imprint on the mail piece, which will be accepted by the postal service that the services certified were in fact performed by the user and thus enable the user to be entitled to further mail rate reductions. Communication in contrast may also be by means of a code or other form with the relevant information transmitted in encrypted format. The information may be scanned and used to automatically set the postal equipment at the user site to proper settings, both for postage and for usage scheduling, without direct user intervention, thus enhancing security and efficiency.

Certification information is provided to the CPU through a plurality of inputs along a mail path designated as 78. Mail piece documents which are stacked in appropriate feeder-stacker unit 80 are, under control of CPU 60 through feeder-unit 82, driven along the mail path 78, past OCR unit 84 where printed material on the mail piece is read, past counter station 86 where individual pieces are counted, to the scale unit 88 where the mail piece is weighed, and thence to a metering station 90 for application of appropriate postage and finally to a certification station 92 where appropriate certification stamps may be placed on the mail piece to indicate compliance of the mail piece with all the criteria that have been set under work sharing requirements required under relevant U.S. Postal Service regulations. Since the unit may be capable of handling prefranked mail, a meter bypass network 94 operating under control of the CPU, provides for bypassing of the mail piece of the metering station 90 without the necessary application of additional postage. Problems encountered in short-weight mail may be adjusted by appropriate decrement of the descending register balance in descending register 74 under program control through CPU 60, based upon differences detected by the computer between applicable postage rate requirements and the actual mail run being passed through the user station 10. An example of short-weight mail is disclosed in copending application, Ser. No. 285,146, U.S. Pat. No. 5,019,991 filed concurrently herewith, and assigned to the assignee of the present application.

The data exchange between the central station and the user station give rise to further novel and unique processing capabilities in accordance with copending application, Ser. No. 285,486. The user equipment can be periodically interrogated as to the customer usage patterns, mail runs, addressees, zip codes, rate breaks, etc. Based on this usage information, information can be down loaded to the user. The down loaded information includes advisory procedures, such as the fact that postal charges for first class mail will increase shortly and that any mail run should be pushed out early, the fact that the user has the ability to avail itself of zip code breaks and other useful information as to mailing habits. In mail addressing, the data base incorporated by the central station also can benefit the user by expansion of the user equipment far beyond its limited nature by taking advantage of the relatively larger data base facilities available at the data center. One particularly advantageous use of the communication capability is the uploading of user mailing lists to a data center. At the data center, the information can be processed relative to the data center data base to sanitize the mailing address list. This includes noting improper zip codes, changes in carrier routes, changes in addresses when people move, etc. The information is thereafter down loaded to the user mailing equipment at the user location to allow the generation of sanitized effective mailing lists. This enables the user to have a higher "hit" rate of properly addressed and properly delivered mail. Moreover, the system provides a tremendous advantage to the U.S.P.S. Billions of dollars are spent in redelivering mail which is improperly addressed. Mail can be improperly addressed for a number of reasons including the fact that an individual has moved and the new address data has not been properly entered into the system. By providing this service to, say, the top 500 mailers in the country, which constitutes in the area of 80% of the mail in the country (3rd class), a tremendous amount of expense would be saved by the Postal Service. Where the mailing lists are small, the businesses can upload their mailing lists to the data center. The uploaded mailing address are sanitized and processed, and in this instance, the center can provide the actual mailing service for the small business by providing the printing of the necessary inserts, inserting the material into the envelopes and addressing andd distributing them. Alternatively, the center can download the address list to the mail business in the appropriate format. It can also be presorted by order with an indication as to the appropriate postage amount. The postage chargeable when the data center provides the mailing service can be directly charged to a user account. Additionally, demographic analysis can be done on the mailing list to identify additional customers who would fall into similar categories and are not yet being serviced by the small business. Moreover, by demographics analysis, other business opportunities for customers of the type serviced by the small business can be identified and provided to the user. The system would include sufficient security to ensure that the mailing list data for the customer is not improperly utilized. This has been described in more detail and claimed in a copending application, Ser. No. 285,145, filed Dec. 16, 1988 (C-463), and concurrently filed application, Ser. No. 416,732 which describes and claims extensions of these concepts.

DETAILED DISCLOSURE OF PREFERRED EMBODIMENTS OF PRESENT INVENTION

Figure 4A:
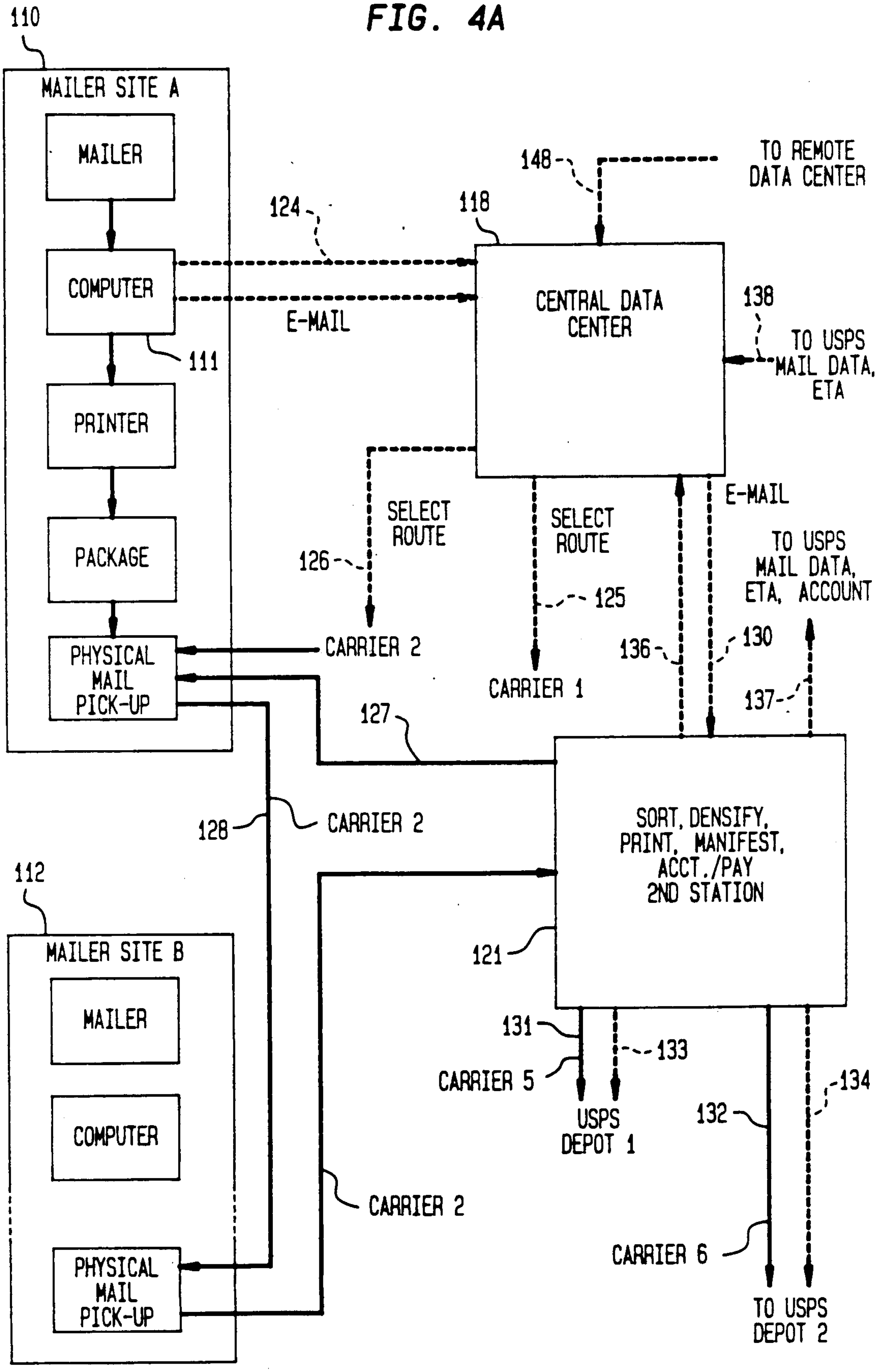
FIGS. 4A and 4B is a schematic diagram illustrating operation of one form of system according to the invention.
Figure 4B:
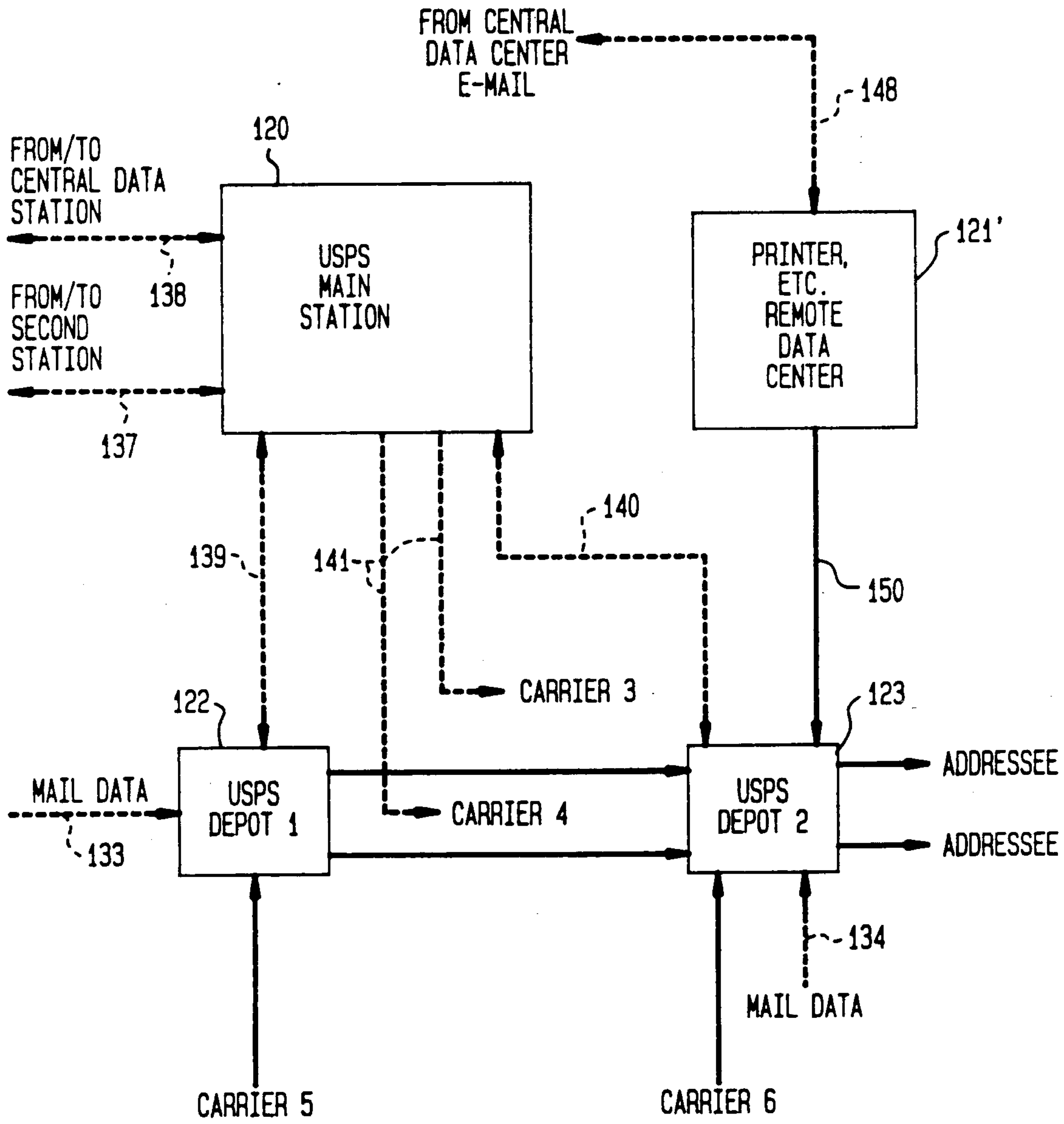

The present invention extends the concepts of work sharing to the domain of the delivery system. It utilizes the same data communications network illustrated in FIGS. 1 and 2, in order to establish at a data center databases of information that will optimize formation and delivery of batch mailings from mailers to the Postal Service, and within the Postal System. One embodiment of a system according to the present invention is illustrated in FIGS. 4A and 4B. As described earlier, a data center 118 is in communication with multiple user stations 110, 112 for receiving and storing information concerning mailing operations being conducted by the users, in particular, information concerning batches of mail that have or will shortly be generated but have not as yet been delivered to a Post Office.

In FIGS. 4A and 4B, the transmittal and reception of data by way of the communications link are indicated by dashed lines, and the movement of physical mail is indicated by solid lines. What will now be described in detail is how a batch mailing can be processed at a typical mailer's site 110.

In accordance with state-of-the-art techniques, advertisements (ads) frequently originate at desktop publishing workstations which create data files representing the content of an ad intended to be distributed in hard copy form to many addressees. The existence of this data file is symbolized by the computer block 111 This file can follow one of two routes. It can be transmitted over the network as electronic mail (E-Mail), or converted by a printer into hard copies. The system allows a decision to be made as to the best way of handling particular mail at the mailer's site, based on such factors as transport costs to local Post Office, postage costs, delivery times, estimated Post Office processing time, available Post Office equipment, Post Office workloads, available discounts, E-Mail processing costs, and others of a similar nature. Other relevant factors are also stated below. To make intelligent decisions requires that the mailer at site A maintain a database of addressees in the various classes to which it regularly sends mailings. As is well known, lists of addressees sorted, for example, by income housing, age, profession or occupation, or location are available, and data files are commercially available which provide to mailers or can be used by mailers to create classes of addressees based on some of these factors for receiving certain mailings. This information can be used at the data center 118 to generate from data obtained from site A a database of parameters of a particular batch mailing in the process of being created, collectively called mail data or batch parameters. By "batch parameters" is meant the various items recited in copending application, Ser. No. 234,977, such as weight, size, mail class, destination, address mode, font, zip codes, bar codes, etc. To further understand how this information is used, other parts of the system need first to be described.

The system preferably includes at least one second station 121. Preferably, a plurality of such second stations are scattered throughout the country or throughout a particular geographic region. Each second station, symbolized by block 121, could include a set-up similar to that illustrated in FIG. 3. Preferably each station 121 comprises standard equipment that can perform at least the following functions: sort physical mail; link to and communicate along the network and capable of receiving data including E-Mail and of printing hard copies of the E-Mail; stuff printed mail into envelopes, and seal and weigh them, using what is known as inserters; print or generate permit mail documentation; account for postage including confirmed accounting to the Post Office for physical batch mailings created at the second station and debiting mailers for their respective costs, or when dealing with pre-franked mail crediting mailers for additional discounts obtained due to batch densification. The primary data processing functions are carried out at the data center 18, and the results are transmitted to the second station for implementation. Additional entities in the system diagram of FIG. 4A are several carriers indicated by the labels carrier 1, carrier 2, carrier 5 and carrier 6. The diagram continues on FIG. 4B and includes blocks 122 and 123 representing U.S. Postal Service depots or Post Offices, and further includes carrier 3 and carrier 4. Each of the carriers is also linked into the network, or other means of communicating with them established. The solid lines connecting the blocks represent physical movements of carriers and physical mail. The dashed lines represent data flow along the communication network and E-Mail where so indicated.

A feature of the inventive system is to optimize delivery of mail that originates as physical mail or as E-Mail. Eventually, when introduced into the Postal System as it presently operates, the mail must be converted to physical mail. But, improvements in efficiency and cost savings can be achieved by a judicious choice of the conversion location. Some of the factors involved in this choice include, in addition to those previously mentioned: location of addressees and mailers, location of second stations, location of Postal Offices, resources available at Postal Offices including manpower and kinds of equipment, urgency of the mail involved and batch sizes, flexibility in merging batches, and discounts available. The data center receives information of mail data from each of the mailer sites, indicated at 124. The data center 118 processes the data to determine:

1. Whether the originating mailer should send E-Mail to it or should convert it into physical mail at the mailer's site.

2. If the decision is physical mail, determine which carriers are available and can pick-up and transport the mail to a second station. In addition, a route for the carrier can be computed as well as a schedule of pick-ups at mail sites and delivery times at the chosen second station. As indicated at 125, via a communication link carrier 1 is instructed to pick up physical mail at site A and delivery it 127 to the second station. Via the link indicated at 126, carrier 2 is instructed to pick up mail at site A, then go to site B and pick up other mail available at that site and deliver to the second station 121, shown at 128. These instructions can take into account resources available at the second station and can schedule batch arrival times to fit anticipated workloads.

3. If the choice is E-Mail, the E-Mail is transmitted via link 124 to data center 118, and from the latter via link 130 to the second station.

In addition, the second station has been instructed by the data center how to create densified mail batches from the physical mail received from the plural mailer sites including the E-Mail. For instance, from the mail data available, new data can be generated showing how new batches could be created containing, for example, more mail pieces per zip code group, or per zip code, or all with the same font, or all with bar codes. These new batches would require less overall handling by the Postal Service than the batches of the individual mailers thereby qualifying them for additional discounts. To form the new batches requires sortation equipment. In addition, if E-Mail is to be included in the physical batches, then the second stations must have the equipment to convert the E-Mail into hard copies, to insert the hard copies into envelopes, and to address the envelopes. Further, since batch mailings require support documentation, the second station needs to be able to print such documentation.

Finally, some means must be available to account for the postage. The latter is more conveniently carried out by the data center which is in communication with each of the mailers, using various known techniques not critical to this invention. One example is described in U.S. Pat. No. 4,837,701.

When the densification process is complete, the second station has ready for delivery new physical mail batches with appropriate documentation. The next phase is to communicate this information to the data center 118, and also to the U.S. Postal Service main station 120, directly or via the data center.

The same capabilities of the system to organize and coordinate carrier pick-up, routing, and delivery of batch mail to the second station, can also be employed to expedite mail processing within the Postal System. Thus, the data center can maintain a database of Postal Service facilities, resources available, and workloads, and thus provide as a service to the Postal Service information that will enable the Service to process arriving mail more efficiently. For example, knowing workloads and periods when a particular depot is busy, the second station could be instructed to time its delivery of the new batches to a depot during a slack period, or while all or extra personnel are available to handle the increased load. Similarly, having sorted according to, say, font or bar code presence, delivery could be routed and scheduled to a different depot having the right kind of equipment to read bar codes or read that particular font. As another example, since Postal Service sorters provide fewer bins than the sum total of zip codes, if, say, all West Coast mail were delivered at a certain time, thus allowing complete sortation in one pass, since fewer bins would be required, it would reduce Postal Service processing time.

FIGS. 4A and 4B illustrate at 131 and 132 physical mail being transported by carrier 5 to depot 1 and by carrier 6 to depot 2. Depot 2 may be selected as the drop-off point for some batches, not only on the basis of available resources, but also because mail delivery would be expedited if introduced into the system at a later delivery stage than at an earlier delivery stage. Moreover, depot 2 might be under-utilized, which, again, would result in faster processing. Before actually dropping off the physical mail at the various depots selected, they each can be informed by a communications link directly (see numerals 133, 134) or via the data center 118 and United States Postal Service main station 120 (see communication paths 136, 137, 138, 139 and 140) of the new mail data or batch parameters and the estimated time of arrival (ETA) at the various depots.

In the same manner that the data center, knowing the mail data and United States Postal Service resources and logistics planning, can advantageously schedule and route carrier transport of mail from the second station to the various United States Postal Service depots, so can the data center assist the Postal Service on its selection of carriers and carrier routing for internal mail transfers between United States Postal Service depots, illustrated by the data links 141 to carriers 3 and 4 which are engaged to convey mail between United States Postal Service depots. In sum, valuable management information is available to the Postal Service from the data center based upon the information stored in its databases of mail data received and compiled from the individual mailers.

FIGS. 4A and 4B also illustrate other advantages of the invention. An additional second station 121, can be provided remote from the data center 118, but, for example, located near to USPS depot 2 123. The remote second station 121', which would have the same equipment as the original second station 121, could then receive from the data center 118 via link 148, as E-Mail, mail intended for the addressees directly served by depot 2 123. The remote second station 121, would then convert the E-Mail to physical mail, as previously described, and drop-off 150 at depot 2 for delivery to the addressees. This would bypass and avoid the need for carriers 3-6, thereby expediting delivery. Another advantage is: suppose that depot 2 has certain automated equipment for high-speed processing of, say, certain address fonts or bar-coded items, but depot 2 does not, yet the physical mail generated at either of the second stations uses that font or barcoding. Then, it would be advantageous to drop-off such mail at depot 2 rather than depot 1, not only because additional discounts may be available due to automated processing, but also because processing in the Postal System would be expedited.

Figure 5A:
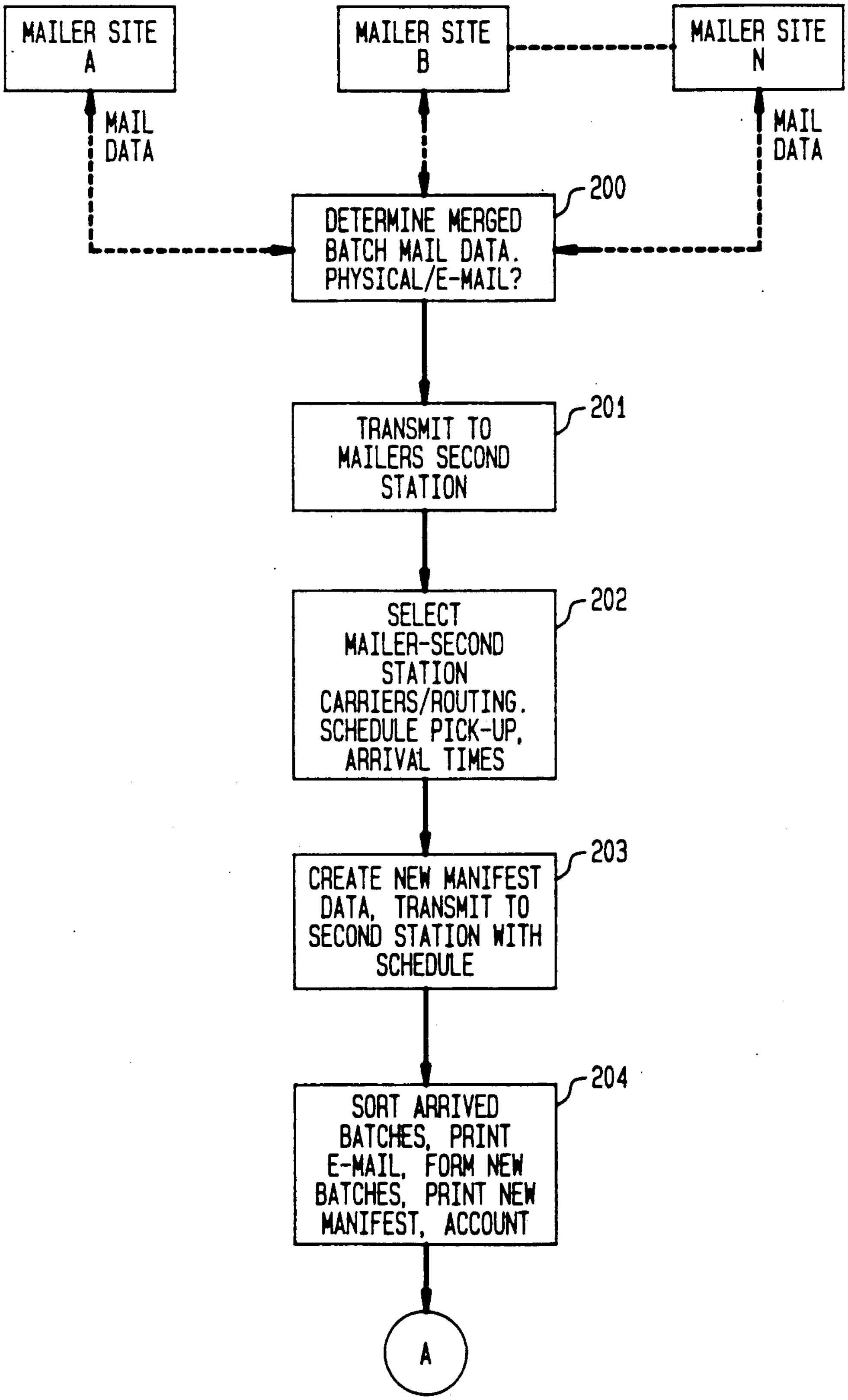
FIGS. 5A and 5B is a flow chart depicting several processing operations of a system according to the invention.
Figure 5B:
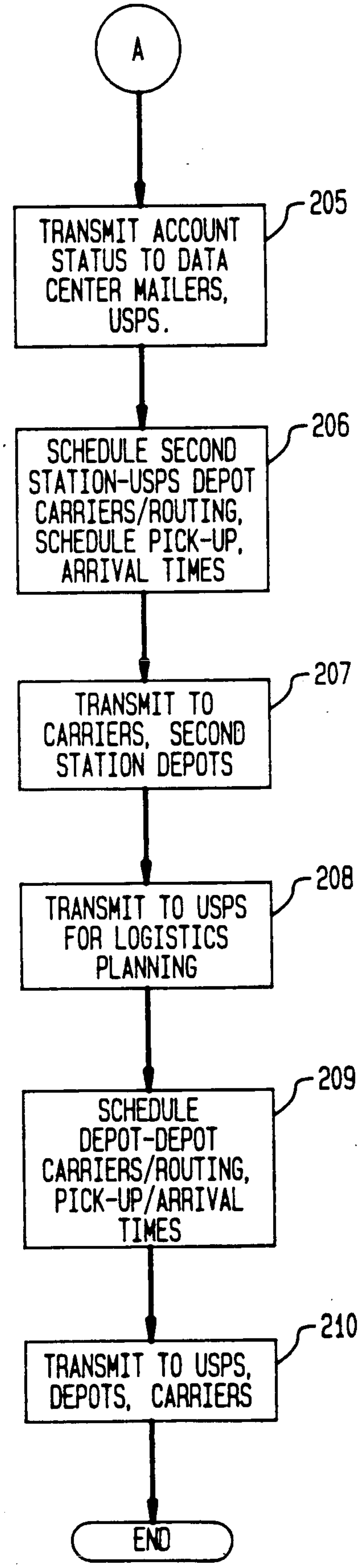

FIGS. 5A and 5B show flow charts also illustrating typical sequences of steps that would be followed by the system schematically depicted in FIGS. 4A and 4B. As illustrated in FIG. 5A, starting at the top, the mailers at sites A . . . N transmit to the data center their determined mail data. The data center at block 200 compiles the information into a database that can be processed in order to create data representative of merged or new mail batches optimized to take advantage of available Postal discounts. A determination is also made whether originally created E-Mail should be transmitted to the second station 121 or reduced to physical mail at the mailer's site 110. The progress to accomplish this and the other functions described will be evident to skilled programmers based upon the description herein given. Next, at block 201, the information is transmitted to the mailers to begin preparation for physical mail pick-up, and to the second station to prepare the latter to receive and process the arriving batches. At block 202, carriers are selected and their routing and pick-up scheduling determined and transmitted to all involved entities. Also, at block 203, the data needed to prepare the new documentation required to obtain Postal discourts is created and stored, and transmitted to the second station and mailers, including ETA at the second station of the mail batches.

At the second station, block 204, any E-Mail is printed, inserted in envelopes, and the envelopes addressed, and it and the incoming physical batches are sorted in accordance with the new mail data received from the data center, the new manifest or other required documentation printed and attached to the new mail batches, and confirmed postage accounting carried out, preferably by transmitting any required information to the data center which would then take the necessary steps to ensure at the Postal Service is given sufficient funds to cover the new batches when they arrive, and to debit the mailers for their respective costs. If the incoming physical mail had been pre-franked or otherwise already accounted for, then a suitable credit for the extra discounts achieved by the batch merging can be provided to each mailer entitled to received it, illustrated at block 205.

At block 206, the data center then selects, routes and schedules the carriers to deliver the newly-formed mail batches to the chosen United States Postal Service depots, and transmits the necessary instructions to the entities involved at block 207. In addition, similar information is transmitted to the United States Postal Service main station. This enables the main station to engage in short-term planning for the elected workload, to allocate resources, and in general perform necessary managent functions to take into account these local workload increases. In addition, the Postal Service can utilize the information possessed by the data center and arrange its own scheduling of processing and shipment of the mail batches, or rely on the data center to provide such information to it, shown at blocks 209 and 210. This cooperation between the Postal Service and its users stands to benefit everyone involved in improving mail processing and delivery. Even the small addition of timing large mail drop-offs at a Postal depot during a slack period, or providing large machinable mail drop-offs at depots having the equipment to handle such mail can have a significant impact on reducing mail delivery times.

Figure 6A:
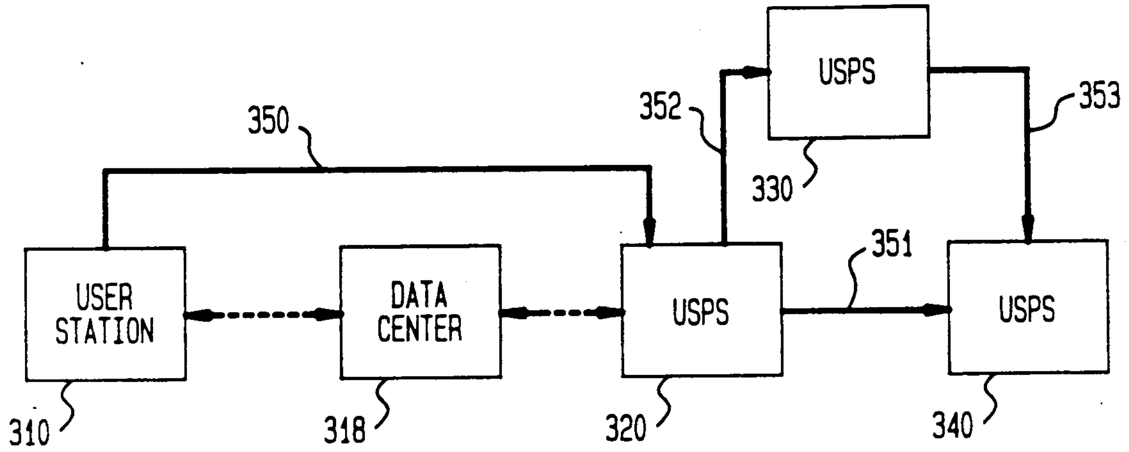
FIG. 6A illustrates a mailing system having various transit routes for mail between several post offices.
Figure 6B:
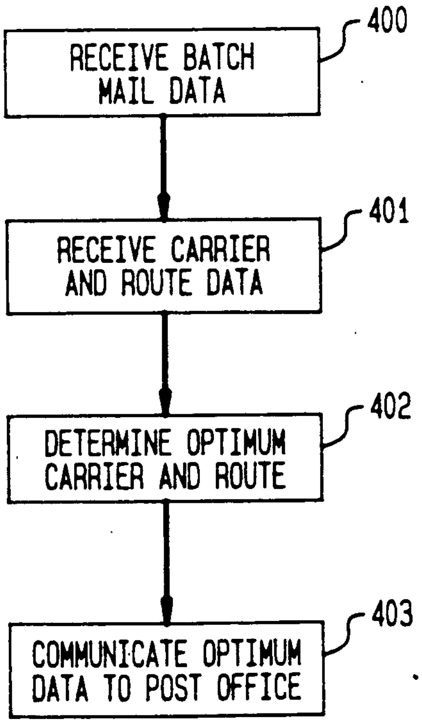
FIG. 6B is a flow chart of a process which can be combined with the present invention.

FIGS. 6A and 6B illustrate an abbreviated version of the system showing just the carrier selection and routing aspects. FIG. 6A illustrates, interconnected, one of many user stations 310, data center 318 and Post Office 320, as above discussed. In additon, further Post Offices 330 and 340, spaced from the post office 320, are also shown. The user station 310 conventionally originates batches of mail, and transports them to the Post Office 320 via route 350. As illustrated, the postal service has a mail route 351 from the Post Office 320 to the Post Office 340, a mail route 352 between the Post Office 320 and the Post Office 330, and a mail route 353 between the post offices 330 and 340. It is thus apparent that mail may be transported directly from the Post Office 320 to the Post Office 340, or indirectly via routes 352 and 353 and the Post Office 330. While it may be more efficient and economical to normally use the route 351 between the post offices 320 and 340, conditions may arise in which a greater efficiency arises by employing the routes 352 and 353 for this purpose. For example, if the carriers transporting mail directly between the post offices 320 and 340 do not have adequate capacity, and it would not be economical at the time to increase their capacity, employing underused capacity along the routes 352 and 353 may result in speedier and more efficient transport of the mail.

In order to enable increases in the efficiency of transit, in accordance with this aspect of the invention, the Post Office 320 communicates the capacity of the various carriers and routes to the data center 318, as well as the current requirements, of which it is aware, for use of these routes. The data center also receives from each of the user stations 310 data concerning their respective mailing requirements, that is, batch information relating to quantity, volume, and destination information. The data center 318 employs the information it has received to determine, for example, the total capacity that will be required to transport mail from Post Office 320 to Post Office 340. In addition, the data center 318 determines the most efficient use of the various carriers and routes for such transport. As an example, if it is determined that a truck travelling between the post offices 320 and 340 will have significant overcapacity, it may be more economical to transport the mail intended for this truck instead via underloaded trucks using the routes 352 and 353. This is of course only one example of the type of determination that may be made by the data center. Such determination is transmitted to the Post Office 320, so that the Post Office may make more efficient use of its facilities. It is also possible for the Post Office to originate a request to the data center for its determination of optimum loading of its trucks and use of its routes. Such interrogation of the data center is especially useful in the event of an emergency that results in the loss or reduction of usability of one or more of the routes.

As illustrated in FIG. 6B, in accordance with this aspect of the invention, the data center receives batch mail data from the users, in block 400, and also receives carrier and route data from the Post Office, in block 401. On the basis of this information, the data center determines the optimum carriers and routes to employ for transporting the mail between the various post offices, at block 402, and communicates this determination to the Post Office 320, at block 403.

Figure 7A:
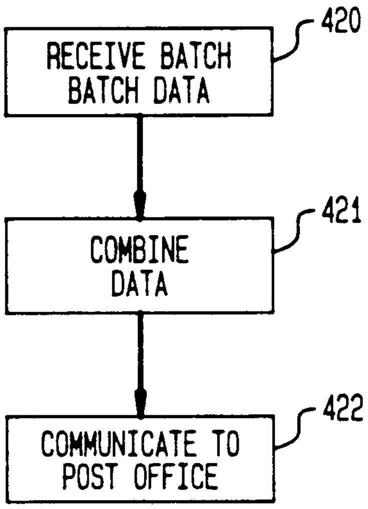
FIGS. 7A and 7B are flow charts depicting other processes in accordance with the invention.
Figure 7B:
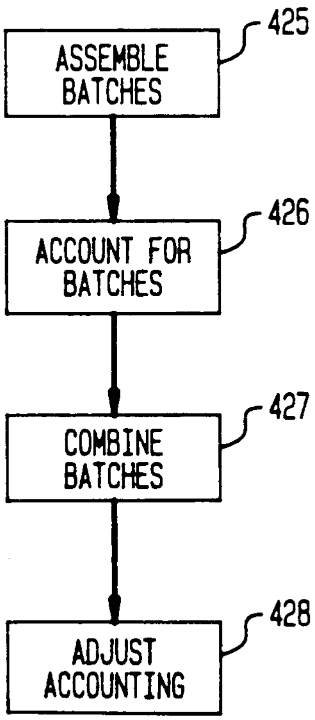

FIGS. 7A and 7B show flow charts illustrating the batch merging feature of the invention from a different aspect. At block 420, the central data center receives mail data from a plurality of the batch mail stations. For this example, the information may include information concerning the machine readability of addresses on the mail, deliverability of the mail, destination information of the mail, and 3602 information. The communication of such information to the data center via the network has already been described.

In accordance with this aspect of the invention, the data center combines this data from several stations, at block 421, and communicates this combined information to the Post Office, at block 422. The combining of the information is effected in a manner to facilitate its use by the Post Office, in order to expedite handling and transit of the mail. For example, the combined information provides information concerning the total number of mail pieces, or the total weight or volume, of mail directed to each postal region, so that the Post Office can readily determine the transit facilities that ill be required for transporting the mail to its branch offices, or to other central Post Offices. Aside from the advantages to the Post Office in enabling more efficient and effective use of its facilities, the system in accordance with the invention also provides advantages to the users, since it permits further reductions in the cost of mailing. Thus, as illustrated in FIG. 7B, each user assembles batches of mail, at block 425, and accounts for these individual batches, at block 426. Upon combining of the data of the batches, at block 427, it will usually be found that rate breaks are possible in the common batch that could not be obtained in the individual batches. Accordingly, the batches are physically combined for submission to the Post Office, with the data center determining any additional rate breaks that may be applicable to each of the users. At block 428, the data center thereby credits each of the users for said additional rate breaks, for example by increasing the values in the descending registers of each of the user stations.

While in the preferred system illustrated in FIGS. 4A and 4B, the provision of independent second stations, which may be subsidiaries of the data center, enables, in effect, a third party to effect the physical merging of the individual mail batches, an alternative method does exist, namely, that the data center will transmit information to the individual users that, for example, if user $U_1$ combines its prospective mail batch with one being assembled by user $U_2$, based upon common parameters, the combined batch would obtain additional discounts which would reduce costs not only for each of the users $U_1$ and $U_2$, but also for the Postal System, since processing a single larger batch is ore cost-effective than processing two or more smaller batches.

Thus, the actual physical combining can occur by trucking the mail batch from user $U_2$ to the user $U_1$ facility, and combining or merging them in accordance with the data center instructions at user $U_1$'s facility. This would then require creation at the user $U_1$ site of the required documentation to accompany the merged batch when dropped-off at a Post Office. In this version of the system of the invention, the data center can still provide carrier selection, routing and scheduling for the merged batch, and also act as coordinator of postage accounting and cost allocation.

The role of the data center is pivotal in implementation of these various aspects of the invention because it stores information obtained from many mailers. Its contributions can be enhanced by maintaining a database of mailer profiles based upon their historical usage patterns. This could typically include such items as: frequency and size of batch mailings, zip code distribution, use of zip+4 or bar code addressing, and printer fonts used. These data items will help determine at the data center those mailers due to commonality of usage patterns whose batch mailings would more likely be combinable to optimize discounts. Moreover, this information, if involving proprietary aspects, could more readily be maintained in a secure manner at the data center, since it need not be transmitted to other users, only the resultant processed information of merged batches. The independence of the data center in the network is therefore an advantage of the system.

Figure 8:
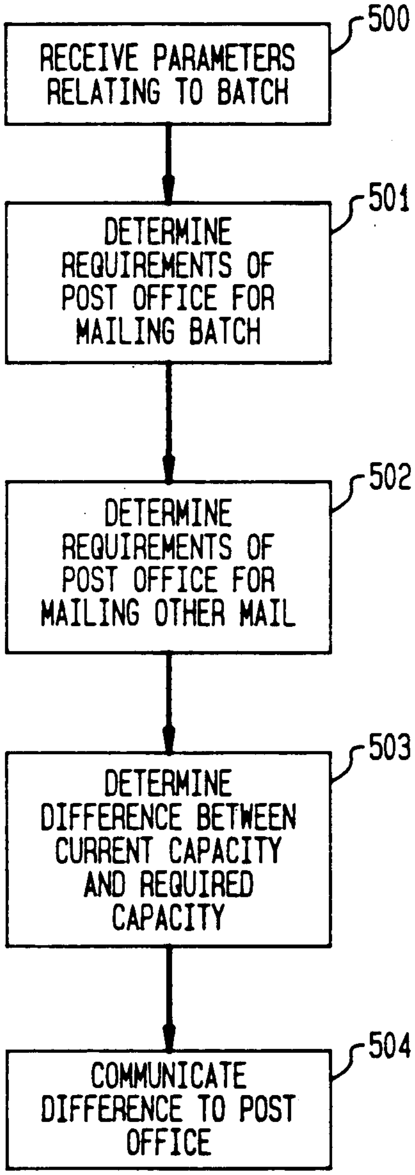
FIG. 8 is a flow chart of still another method which can be combined with the present invention.

As mentioned above in connection with the detailed description of FIGS. 4A and 4B, the data center performs a useful service in providing information to the Postal Service for logistics planning. FIG. 8 further illustrates an embodiment in accordance with this aspect of the invention. In FIG. 8, the data center receives parameters from a user station, at block 500, relating to a batch of mail that has not has yet been received or processed by the Post Office. The types of information which may be communicated in this step will be discussed in greater detail below.

On the basis of this information, the data center determines the requirements of the Post Office for handling the batch of mail, at block 501. This step may include, for example only, determining the number of man-hours required for various processing steps, such as manual sorting, transportation requirements for transporting the mail between Post Office facilities, time required for processing the mail by various available equipment at the Post Office, etc.

The data center also determines the requirements of the Post Office for mailing other mail than the aforementioned batch of mail, at block 502. This step includes receiving from the Post Office information concerning usage of the particular Post Office facilities. The information may be based upon past usage, the data center having stored such information, or it may be based upon current information concerning the actual present workload of the post office. On the basis of this information, the data center determines the other requirements placed upon the Post Office facilities, preferably in a manner similar to that described above.

On the basis of its determination of the requirements of the Post Office for mailing the above batch of mail, and mailing other mail, the data center determines the difference between the total required capacity of the Post Office to handle all of this mail, and the actual current capacity of the post office, at block 503, and communicates this information to the post office, at block 504. The actual current capacity may of course be communicated to the data center from the Post Office, and may include information such as the number of employees available for processing mail at determined processing steps, the transportation facilities, such as mail trucks or other apparatus, available for current transportation of mail, and the availability of other mail processing equipment.

The Post Office can then employ the information it has obtained from the data center for making available suitable facilities for the efficient and effective processing of its mail workload. Thus, the Post Office may find it advantageous to increase or decrease its staff during certain periods, to increase or decrease the available transportation facilities, etc. This aspect of the invention, which is also claimed in the copending case, is thus related to improvement of the logistics at the Post Office, i.e. a method and system for advising the Post Office of information relating to mailings by users to permit that Post Office to plan for the handling of the mail. By means of this information provided by the data center, the Post Office can estimate how many personnel will be required, e.g. for sorting, how may trucks will be required to go to different locations, etc. This aspect of the invention thereby enables the Post Office to more effectively plan ahead to ensure that it has adequate facilities to handle the expected quantities of mail in a manner heretofore not possible.

Typical information concerning batches of mail that may be useful, in accordance with this aspect of the invention, for enabling the Post Office to plan ahead, are:

1. Readability of addresses. This information may indicate whether or not the address information on the mail can be machine read, e.g. if it has a machine readable font, or if personnel will be required to sort it.

2. Deliverability of the mail. This information may indicate whether or not the mail is provided with existing zip codes. If not, personnel will be required to provide the correct zip code. The information may also relate to whether or not the addressees still live at the given addresses, whether forwarding may thus be necessary, etc.

3. 3602 information—This information relates to the weights, volumes, classifications, carrier route information, zip codes, appropriate bar codes, etc. of the mail.

4. Destination—This information may relate to conformity between the zip codes on the addresses, and the actual addresses on the mail. If conformity does not exist, then personnel will be required to provide a conforming zip code.

It is of course apparent that information other than the above may be employed, in accordance with this aspect of the invention.

In accordance with a further feature of this aspect of the invention, an interactive interface may be provided between the Post Office and the data center, whereby the Post Office may continually update the data center on Post Office usage information, the Post Office may interrogate the data center at any desired time for facilitating its logistic planning, and the data center may continually update its data base concerning expected required usage of the Post Office facilities by the user stations.

In addition, the data center, based upon information it receives from the users and the Post Office, can forecast occurrences of excess capacity in the Postal Service, so that either the Post Office may reduce its current capacity, enable use of such excess capacity by other post offices, or permit the Post Office to plan for usage of the excess capacity for other tasks.

Also, as earlier indicated, determining so-to-speak time windows of excess capacity at particular postal facilities will allow the users to time their mail drop-offs during a window period for more efficient processing of the mail As is evident from the foregoing, the data center, in communication with many users or mailers, can assemble and process much useful information concerning prospective batch mailings, based not only on the mailing history of the users but also on direct inputs of planned mailings. Coordinating this information into a database creates an excellent source of information of great use to the Postal System to assist it in its planning and operations. In addition, the information obtained from the Postal System on its operations, when coordinated with that obtained from the users, puts the data center in a unique position to advise mailers and the Postal System on choice of carriers and routing to optimize mail batch deliveries through the system.

While the invention has been described in terms of a new system, it will be understood that different features of the invention, as will be evident from the flow charts, can also be expressed as a new method or process for improving mail deliverability, and the invention is not to be limited to a system architecture. Moreover, while the system and process of the invention are obviously most applicable to the processing and deliverability of mail articles, generated originally as mail batches, it will further be understood that the principles of the invention as above described are generally applicable to any application or environment involving article batches to be delivered to a common shipper which will grant additional shipping discounts as a result of preprocessing of the individual batches which lighten the workload of the shipper.

While the invention has been disclosed with reference to a limited number of embodiments, it is apparent that variations and modifications may be made therein, and it is therefore intended in the following claims to cover each such variation and modification as falls within the true spirit and scope of the invention.

What is claimed is:

1. An article processing system comprising:

(a) a plurality of user batch stations each having means for assembling article batches and determining article parameters of said batches and computer means for storing said determined article parameters;

(b) a data center having computer means;

(c) a shipping station for receiving batch articles and for processing same for delivery to article addressees, said shipping station offering discounts for submitted article batches that comply with certain regulations and are properly documented;

(d) a communications data link connecting the user station computers and the data center computer;

(e) said data center comprising:

(i) means for collecting from multiple user stations via said data link data representing article parameters of article batches assembled or to be assembled to be forwarded to the shipping station, (ii) means for processing said article parameters data for determining ways for merging some or parts or all of said article batches such that a merged batch will qualify for discounts when delivered to said shipping station, 2. An article processing system comprising:

(a) a plurality of user batch stations each having means for assembling article batches and determining article parameter said batches and computer means for storing said determined article parameters;

(b) a data center having computer means;

(c) a shipping station for receiving batch articles and for processing same for delivery to article addressees said shipping station requiring shipping funds so as to process articles delivered to it and offering discounts for submitted article batches that comply with certain regulations and are properly documented;

(d) a communications data link connecting the user station computers and the data center computer;

(e) said data center comprising:

(i) means for collecting from multiple user stations via said data link data representing article parameters of article batches assembled or to be assembled to be forwarded to the shipping station, (ii) means for processing said article parameters data for determining ways for merging some or parts or all of said article batches such that a merged batch will qualify for discounts when delivered to said shipping station, (iii) means for creating the data for producing the required documentation to accompany the merged batch, (iv) means for communicating via the data link with the user stations whose batches are to be merged to transmit to them information enabling their respective mail batches to be merged.

3. A mail processing system comprising:

(a) a plurality of user batch mailing stations each having means for assembling mail batches and determining mail parameters of said batches and computer means for storing said determined mail parameters;

(b) a data center having computer means;

(c) a postal station for receiving batch mail and for processing same for delivery to mail addressees, said postal station requiring postage funds so as to process ail delivered to it and offering discounts for submitted batch mailings that comply with certain regulations and are properly documented;

(d) a communications data link connecting the user station computers and the data center computer;

(e) said data center comprising:

(i) means for collecting from multiple user stations via said data link data representing mail parameters of mail batches assembled or to be assembled to be forwarded to the postal station, (ii) means for processing said mail parameters data for determining ways or merging some or parts or all of said multiple mail batches such hat a merged batch will qualify for discounts when delivered to said postal station, (iii) means for creating the data for producing the required documentation to accompany the merged batch, (iv) means for communicating via the data link with the user stations whose batches are to be merged to transmit to them information enabling their respective mail batches to be merged.

4. The system of claim 3, wherein the information recited in element (e)(iv) includes information instructing at least one of the user stations to transport its mail batches to another user station for merging at said other user station.

5. The system of claim 3, further comprising:

(f) at least one second station, said second station comprising:

(i) computer means connected to said data center, (ii) means for receiving from said user stations the mail batches which are to be merged, (iii) means for receiving from the data center information sufficient to form the merged batch from the received mail batches and data to generate the required accompanying documentation, (iv) means for forming the merged batch in accordance with the information received in element (iii), (v) means for generating the documentation in accordance with the data received in element (iii), whereby when the merged batch with documentation is delivered to the postal station, it will qualify for discounts;

said data center comprising means for allocating among the user stations whose mail batches have been merged the postage funds including discounts as required by the postal station to process said merged batch.

6. The system of claim 5, wherein element (f)(ii) comprises means for receiving the mail batches in physical or electronic form.

7. The system of claim 5, wherein the information recited in element (e)(iv) includes information instructing said user stations to transport its mail batches to the second station.

8. The system of claim 7, wherein said second station comprises sortation equipment and printers.

9. The system of claim 5, further comprising at least one carrier for physical mail, said data center comprising means for scheduling said carrier to pick-up a mail batch from one or more user stations and deliver same to the second station.

10. The system of claim 9, wherein said data center comprises means for scheduling said carrier to pick-up a merged mail batch from the second station and deliver same to the postal station, and means for notifying the postal station of the arrival time of the merged batch.

11. The system of claim 3, wherein said data center comprises means for informing the postal station of the arrival time of merged batches and of the mail parameters of the merged batches.

12. A method for improving the processing of mail in a system having a plurality of user batch mailing stations each having means for assembling mail batches and determining and storing mail parameters of said batches, a data center, and a postal station for receiving batch mail and for processing same for delivery to mail addressees, said postal station offering discounts for batch mailings that comply with certain regulations and are properly documented, comprising the steps:

(a) establishing a communications data link connecting the user stations to the data center;

(b) collecting from multiple user stations via said data link data representing mail parameters of assembled mail batches to be forwarded to the postal station, (c) processing said mail parameters data for determining ways for merging some or parts or all of said multiple mail batches such that one or more merged batches will qualify for discounts when delivered to said postal station or delivery time through the system will be reduced, (d) creating the data for producing the required documentation to accompany a batch, (e) communicating via the data link with the user stations whose batches are to be merged to transmit to them information concerning merging of their respective mail batches.

13. The method of claim 12 wherein said system further comprises a second station having sortation and printing means, said method further comprises the step of:

(f) including the second station in the communication data link, (g) the information transmitted in step (e) includes instructions to the user stations to transport their mail batches to the second station, and (h) transmitting to the second station the merged batch data for merging the mail batches received from the user stations

14. The method of claim 13, further comprising the steps:

(i) forming merged batches in accordance with the merged batch data, (j) creating the necessary documentation to accompany the merged batches, (k) delivering the merged batches with documentation to the postal station.

15. The method of claim 14, further comprising the steps of:

(1) scheduling the pick-up and delivery of mail batches from the user stations to the second station and from the second station to the postal station

16. The method of claim 14, further comprising:

(m) informing the postal station of the arrival times of merged batches and of their merged batch data.

17. The method of claim 12, wherein said user stations have different usage patterns, and wherein step (c) is carried out by merging multiple mail batches from different users based upon their usage patterns.

18. In a method of mail processing in a system comprising a plurality of user batch mailing stations each having means for assembling individual mail batches and determining predetermined parameters of said batch, a post office having mail processing facilities which are used to process mail having certain parameters, and a data center in communication with the user mailing stations and possessing information as to the handling by the post office processing facilities of batch mailings, comprising the steps:

(a) receiving from the user mailing stations data representing one or more parameters of plural mail batches to be delivered to a post office processing facility, (b) determining from said received data of step (a) whether said individual mail batches have common parameters allowing the post office processing facility to bulk process combined plural individual batches, (c) transmitting to the user mailing stations information enabling combining individual mail batches that can be bulk processed when delivered to the post office processing facility.

19. In the method of claim 18, further comprising the post office facility providing additional postage discounts for batch mail having certain parameters, said data center using said discount-producing parameters to determine the information of step (c).

20. A mail processing system comprising:

(a) a plurality of user batch mailing stations each having means for assembling mail batches and determining mail parameters of said batches and computer means for processing and storing said determined mail parameters;

(b) a data center having computer means;

(c) a postal station for receiving batch mail and for processing same for delivery to mail addressees;

(d) a plurality of carriers for transporting mail batches;

(e) a communications data link connecting the user station computers and the data center computer and the carriers;

(f) said data center comprising:

(i) means for collecting from multiple user stations via said data link data representing mail parameters of assembled mail batches to be forwarded to the postal station, (ii) means for collecting from multiple carriers data representing available capacity;

(iii) means for processing said mail parameters data and said carriers data for determining ways for merging some or parts or all of said multiple mail batches and delivering them along at least a portion of a route to the Postal Station, (iv) means for communicating via the data link with the user stations whose batches are to be merged and with the carriers to transmit to them a schedule for pick-ups of said mail batches.

21. The system of claim 20, further comprising:

(f) at least one second station, said second station comprising:

(i) computer means connected to said data center, (ii) means for receiving from said user stations mail batches, processing the mail batches and preparing them for transport to a postal station, (g) said data center having means for scheduling and routing carrier transport of processed mail batches from the second station to the Postal Station.

22. The system of claim 21, wherein the second station comprises means for merging some or all of the received mail batches.

23. The system of claim 20, wherein said data center comprises means for storing information concerning workload distribution of the postal station, and the carrier scheduling is done to cause arrival of the mail batches during a slack period.

24. The system of claim 20 wherein said data center comprises means for notifying the Postal Station of the arrival time and mail parameters of the mail batches.

25. The system of claim 20, wherein said data center comprises means for transmitting said processed data to said post office center for expediting processing of said batches by said post office center.

26. The system of claim 25, wherein the parameter data includes machine readability of mail addresses, addressing mode, addressee distribution and mail volume.

27. The system of claim 26, wherein the data center has a database of post office facilities and their resources, and the batch data processing includes relating the user batch data to post office resources to improve resource utilization.

28. The system of claim 26, wherein said post office center includes means for utilizing the data received from the data center for logistics planning for processing of said batches when received.

29. In a method of mail processing in a system including a data center, multiple user batch mailing stations coupled to communicate with said data center, and a post office center having mail processing facilities and equipment and coupled to communicate with said data center, the method comprising:

(a) receiving data relating to predetermined parameters of batches of mail that has been or will be forwarded to said post office center;

(b) receiving logistics planning information;

(c) using the information received in steps (a) and (b) for transmitting to said user mailing stations batch merging information and scheduling information for delivering the said mail batches, to a post office processing facility.

30. The method of claim 29, the further step is:

(d) the said scheduling information transmitted in step (c) includes information as to capacity and resources of the post office processing facility.

31. The method of claim 29, including the step of delivering a mail batch to a post office processing facility that has said certain mail processing equipment in response to parameters for processing by certain mail processing equipment.

32. The method of claim 29, including the step of delivering a mail batch to a post office processing facility during a slack period in its activities in response to said logistics planning information.

* * * * *